Jan. 5, 1954    J. A. BALDWIN    2,665,075
MANUFACTURE OF OIL FILTERS
Filed Nov. 17, 1950    5 Sheets-Sheet 1

INVENTOR
JESSE A. BALDWIN,
BY *[signature]*
ATTORNEY

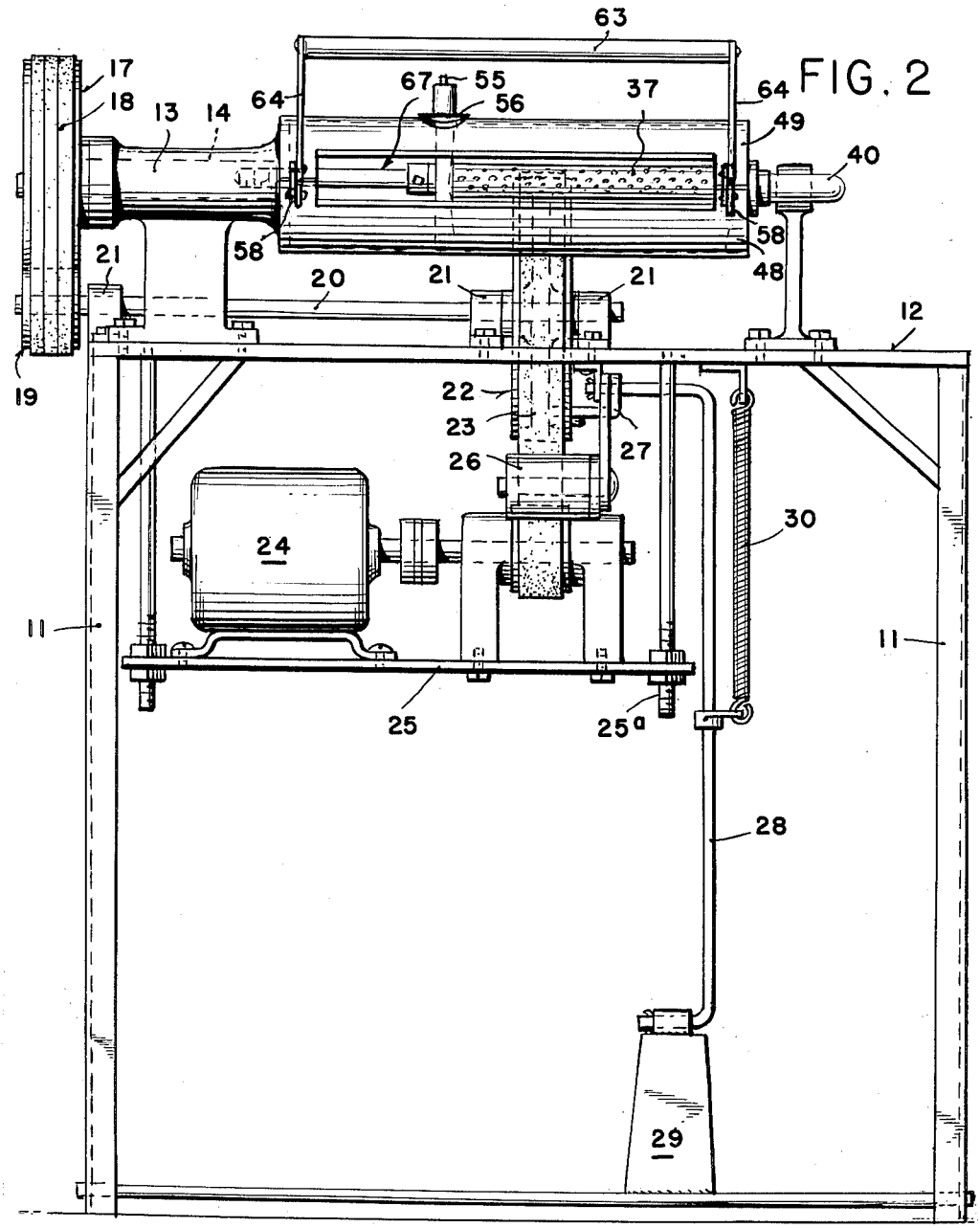

Jan. 5, 1954          J. A. BALDWIN          2,665,075

MANUFACTURE OF OIL FILTERS

Filed Nov. 17, 1950          5 Sheets-Sheet 3

INVENTOR
JESSE A. BALDWIN,
ATTORNEY

Jan. 5, 1954   J. A. BALDWIN   2,665,075
MANUFACTURE OF OIL FILTERS
Filed Nov. 17, 1950   5 Sheets-Sheet 4

INVENTOR
JESSE A. BALDWIN,

BY *J Harold Kilcoyne*
ATTORNEY

Jan. 5, 1954 J. A. BALDWIN 2,665,075
MANUFACTURE OF OIL FILTERS
Filed Nov. 17, 1950 5 Sheets-Sheet 5

INVENTOR
JESSE A. BALDWIN,
BY
ATTORNEY

Patented Jan. 5, 1954

2,665,075

UNITED STATES PATENT OFFICE 2,665,075

MANUFACTURE OF OIL FILTERS

Jesse A. Baldwin, Ashland, Wis., assignor, by mesne assignments, to Reconstruction Finance Corporation, Denver, Colo., a corporation of the United States Application November 17, 1950, Serial No. 196,203

17 Claims. (Cl. 242—7)

This invention relates to improvements in the manufacture of oil filters of the replaceable filter-element or cartridge type, and more particularly to an improved machine for winding the absorbent body of a filter element upon a core, which may be the tubular inner screen of the filter element.

Although not limited thereto, a winding machine according to the invention is designed for and has special utility in forming the absorbent body of a filter element of the type disclosed in my Patent No. 2,357,572, dated September 5, 1944, by winding a "rope" of loosely associated and generally longitudinally disposed cotton threads upon a core which may be and preferably is constituted by the tubular inner screen of the patented filter element. As is well known, the absorbent body of such a filter element must be so formed as to provide efficient filtering action while permitting free inflow of oil therethrough without channelling or undue radial compression of the absorbent body under the pressure of the oil passing therethrough. Quantity production of such filter elements imposes the further requirement of forming the absorbent filter body in a high speed machine operation, and also makes it highly desirable to assemble the cylindrical outer shell on the filter body immediately upon its formation and preferably in the winding machine employed to form the same, both to reduce handling operations and to provide for assembly of the outer shell on filter body prior to any change of the structure or the winding tension of the filter body taking place.

Accordingly, it is a principal object of this invention to provide a machine for winding a relatively thick rope of loosely associated and generally longitudinally extending threads of fibrous material upon the tubular inner screen of a filter element to the form of a roughly cylindrical body characterized by homogeneous structure throughout and by the absence of any division lines between the convolutions or windings of the rope making up the same.

Another object of the invention is the provision of a machine for winding an absorbent filter body as aforesaid from a rope of loosely associated fibers, such as cotton, wherein the filter body results from the rope being fed to the core in criss-cross manner, whereby the threads of the convolutions or windings of the rope are blended together and interlocked as required to prevent channelling taking place in the filter body under the condition of oil flow therethrough.

A further object of the invention is the provision of a machine for winding an absorbent filter body from a rope of loosely associated cotton fibers under operator-controlled tension which is preferably such as to impart to the wound body the requisite density enabling it to retain its cylindrical form and dimension under the compressive force of the oil in passing radially inwardly therethrough, while at the same time permitting relatively free flow of the oil through the filter body.

Yet another object of the invention is the provision of a machine for winding the absorbent body of a filter element of the type disclosed in my Patent No. 2,357,572 aforesaid, which has the further advantage of enabling assembly of the cylindrical outer shell upon the absorbent body upon its completion and prior to its physical removal from the machine.

A still further object of the invention is the provision of a machine for forming an absorbent filter body on the tubular inner screen of the filter element functioning as a core, which includes a mandrel for mounting the screen having automatic clutch means for driving the tubular screen from the mandrel during the winding operation, and which is effective to provide quick reelase of the screen from mandrel when it is desired to remove the completed filter body.

Other objects and advantages of a winding machine according to the invention will appear in the following detailed description thereof taken with the accompanying drawings illustrating one form of winding machine giving excellent results in practice, wherein:

Fig. 2 is a front elevation thereof;

Figure 1:
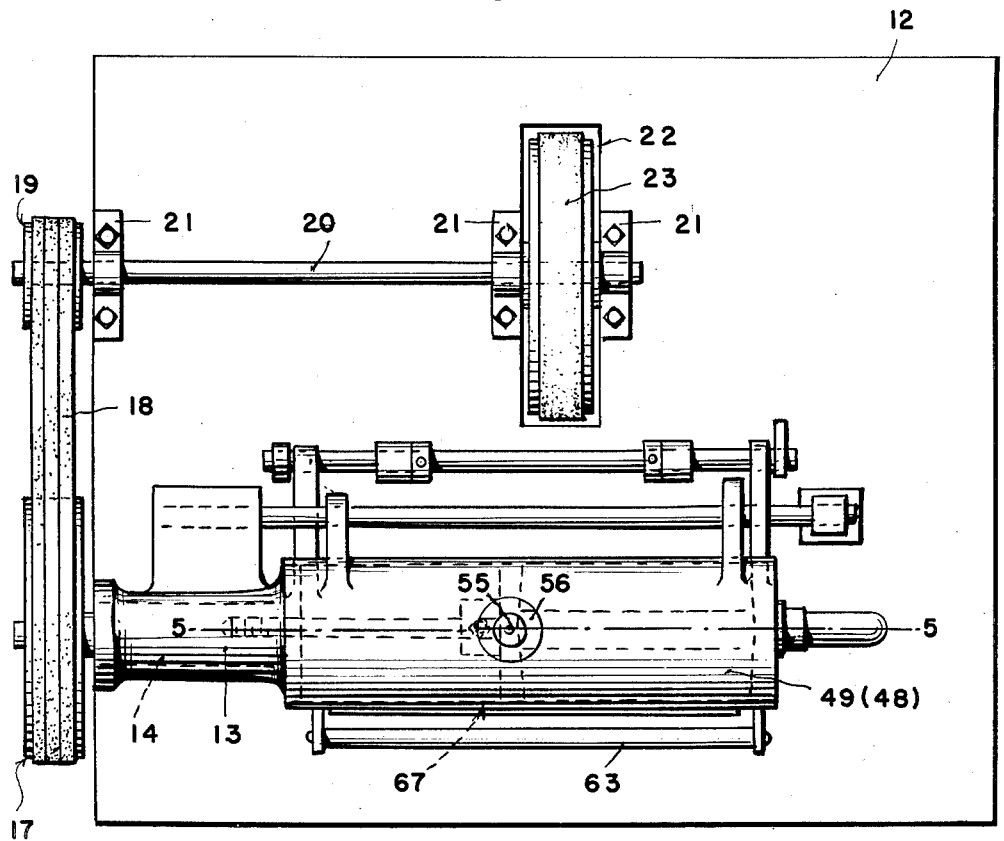
Fig. 1 is a top plan view illustrating the general arrangement and association of the component parts of a filter-body winding machine of this invention.

A filter-body winding machine according to the present invention illustratively comprises supports 11 carrying a platform 12, upon which is mounted a horizontally disposed pedestal bearing 13. Mounted for rotation within the bearing 13 is a powered shaft 14 for the winding mandrel to be described, the shaft having a thrust flange 15 at its inner end which is provided with a left-hand-threaded axial bore 16. The aforesaid shaft 14 is powered through a sheave 17 keyed to said shaft at its outer end, the sheave being driven by belts 18 from a sheave 19 mounted upon shaft 20 supported on the platform 12 as by bearing members 21. A pulley 22 affixed to shaft 20 near its inner end is driven by belt 23 from any suitable power source, preferably from an electric motor 24 supported beneath the platform 12 on a base 25, which is carried by hang-bolts 25a which latter permit limited adjustment in the elevation of the base as required to vary the initial tension on the driving belt 23.

Figure 3:
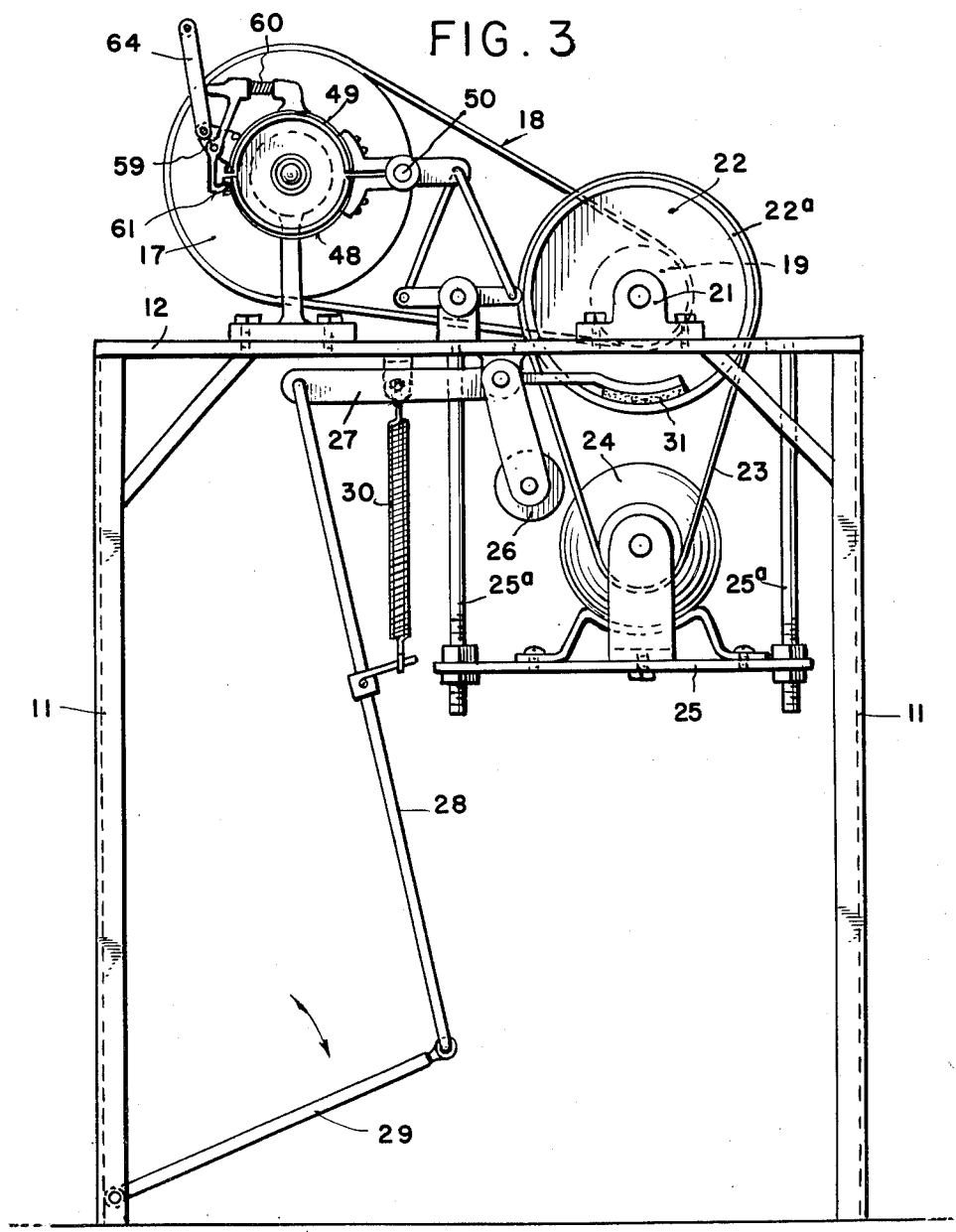
Fig. 3 is an end elevation thereof, the view illustrating one form of driving and braking means for the machine.

Normally, the belt 23 has sufficient slack as to be ineffective to transmit drive from motor 24 to the pulley 22. However, drive to the pulley 22 and thence to the powered shaft 14 is obtained by rocking movement of an idler pulley 26 against the belt 23, as required to take up the normal slack thereof. To provide such movement, the idler pulley 26 is carried at the end of one arm of a bell crank lever 27 which is fulcrumed intermediate its ends to the underface of the platform 12, the other arm of the bell crank being connected by a link 28 to a foot pedal 29, which latter is normally held raised by a spring 30 reactive between the platform and the upper end of said link. As seen in Fig. 3, the bell crank carries a brake shoe 31 which normally bears on the inner periphery of a flange 22a of the pulley 22, thus to brake the pulley against rotation. According to the aforesaid arrangement, however, when the foot pedal 29 is depressed, idler pulley 26 is swung counter-clockwise against the driving belt 23 to take up the normal slack therein, and simultaneously the brake shoe 31 is raised from the pulley flange 22a, whereupon drive is transmitted from motor 24 to pulley 22 and thence to the powered shaft 14. Conversely, when pressure on the foot pedal 29 is released, bell crank lever 27 swings clockwise under the bias of spring 30, thereby to disengage idler pulley 26 from the driving belt 23 and to engage the brake shoe on pulley flange 22a, thereby to positively interrupt the drive from motor 24 to the powered shaft 14.

Figure 5:
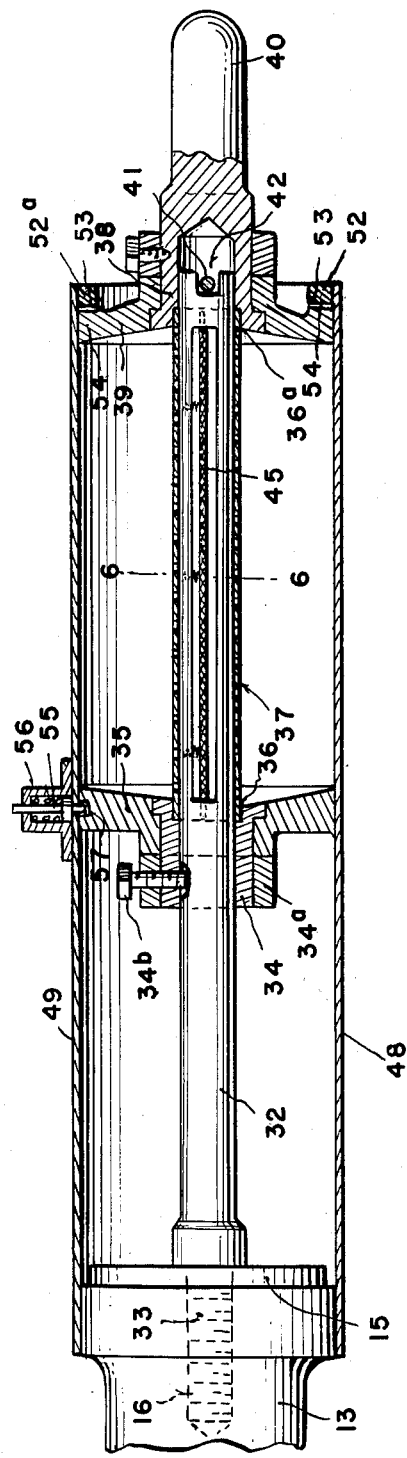
Fig. 5 is a vertical longitudinal section of the mandrel and winding cylinder taken along line 5—5 in Fig. 1.
Figure 6:
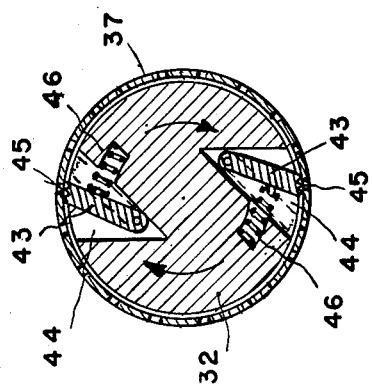
Fig. 6 is a transverse section taken through the mandrel on line 6—6 of Fig. 5, the view illustrating details of the clutch for driving the tubular inner screen forming the core of the filter body from the mandrel.

Referring to Figs. 5 and 6, the above referred to winding mandrel is designated by the reference numeral 32, and is shown to have a reduced threaded end 33 adapted to be received in the threaded bore 16 of the powered shaft 14, whereby the mandrel is drivingly connected to the latter. A bearing sleeve and stop collar assembly 34, 34a is affixed to the mandrel for rotation therewith as by a set screw 34b, and journaled on the bearing sleeve is an end disk 35 having diameter corresponding to that of the filter body to be wound on the mandrel, it being understood that the end disk defines one end of the filter body resulting from the winding operation to be described. It will be noted that the bearing sleeve is formed with a small-depth counterbore 36 opening through its inner end face for receiving and seating one end of the tubular inner screen 37 of the filter element, which latter functions as a core upon which the filter body is wound.

A companion but oppositely disposed bearing sleeve 38 is adapted to be coupled to the outer end of the mandrel 32 for rotation therewith, and has journaled thereon an end disk 39 which is companion but oppositely disposed to the end disk 35, the end disk functioning to define the other end of the filter body being wound. The bearing sleeve 38 and end disk 39 carried thereby are adapted to be removed as a unit from the winding mandrel 32, thus to permit the removal of the wound filter body and the replacement of the core (tubular filter screen 37) for the next filter body to be wound, and to facilitate its removal, the bearing sleeve 38 is provided with an axially extending handle 40. The bearing sleeve 38 and its handle 40, and the end disk 39 are coupled to the driving mandrel, as by means of a coupling pin 41 extending diametrically through the bore of the sleeve, so as to engage in a slot 42 cut into the end of the mandrel. Thus, when pin 41 is engaged in slot 42, the bearing sleeve 38 is coupled to the mandrel for rotation therewith, but the sleeve can be readily uncoupled from the mandrel merely by outward pull on the handle 40.

It will be seen that the removable bearing sleeve 38 is also provided with a counterbore 36a corresponding to the counterbore 36 of the bearing sleeve 34, but arranged oppositely thereto. Said counterbore 36a is adapted to receive and seat the other end of the core 37. The purpose of said counterbores 36 and 36a is to insure that the fibers or threads from which the filter body is wound do not extend to and over the ends of the core 37, but instead terminate short of said ends so that they may be flanged outwardly for a small distance over the end faces of the filter body following its winding and removal from the machine.

Since the filter body is built up on the core 37, it is necessary that the core be positively driven by the mandrel 32. To provide for such a positive drive and at the same time to permit quick release of the core when it is desired to remove the completed filter body from the mandrel, releasable clutch means for coupling the core to mandrel are built into the latter. Such means illustratively comprises two clutch elements, but inasmuch as they are identical, a description of one element will suffice.

Referring to Fig. 6, each clutch element comprises a longitudinal bar 43 arranged within a V-shaped slot 44 extending longitudinally of the mandrel, the bar being pivoted adjacent its inner edge to the end walls of the slot. The width of the clutch bar 43 is such that its other longitudinal edge 45 is contained within the outer circle of the mandrel 32 when the bar is swung relatively clockwise with respect to the mandrel to its retracted or dotted line position, but that said outer edge projects a slight distance beyond said circle when the bar is swung to its normal clutching position in which it is shown in full lines in Fig. 6. The clutch bar is normally urged to its clutching or full line position by means of springs 46 effective against its relatively under face. To augment its gripping action, the outer side edge 45 of the clutch bar is serrated or otherwise provided with a multiplicity of gripping teeth, which are adapted to bite into the inner surface of the core or to enter the perforations of the core when the latter is constituted by a tubular screen member corresponding to the inner tubular screen of a filter element of my aforesaid patent No. 2,357,572.

The aforesaid clutching means permits the core 37 to be slid axially over the mandrel with a slight clockwise twist, resulting in the clutch bars retracting within the outer circle of the mandrel. Upon the core being slid along the mandrel until its inner end seats in the counterbore 36 of the bearing sleeve 34, the clutch bars swing counterclockwise under the urge of their springs 46, with the result that their outer serrated edges 45 grip the inner surface of the core. Thereupon, as the mandrel is driven in clockwise direction, the clutch bars 43 positively drive the core with the mandrel, as required for the winding of the filter body. When it is desired to remove the completed filter body, the latter with its core is released from the mandrel by simply twisting the filter body clockwise with respect to the mandrel, such resulting in the clutch bars 43 retracting within the circle of the mandrel, whereupon the filter body and its core may be axially withdrawn from the mandrel.

It is desirable to wind the body within a winding cylinder, thus to give cylindrical definition to the body. According to the invention, such a winding cylinder is provided by two semi-cylindrical shell members 48 and 49 mounted to swing toward and away from one another about the axis of a shaft 50. Preferably the shell members partake of their movement toward and away from one another in unison by means of a linkage arrangement generally designated 51, whereby movement of the upper shell 49 from open to closed position, and vice versa, effects a similar movement of the lower shell 48. When closed against one another, the semi-cylindrical shells 48 define a cylinder which is closed at its ends by the end disks 35 and 39.

By reference to Fig. 5, it will be observed that the axial length of the cylinder is substantially greater than the axial spacing between said end disks, with the excess length closing the space between the thrust flange 15 of the powdered shaft 14 and the end disk 35. Such arrangement provides a simple means for giving the necessary length of winding cylinder for filter bodies of greater axial length than that for which the illustrated machine is set up to produce, the set screw securement of the inner bearing sleeve 34 to the mandrel 32 permitting the sleeve and the end disk 35 mounted thereon to be shifted axially to the left as required for the winding of filter bodies of greater axial length than that illustrated.

It will be recalled that the end disks 35 and 39 are journaled on the bearing sleeves 34 and 38, so that they are in effect non-rotatably mounted on the mandrel. Preferably, the winding cylinder shell members 48 and 49 lock with the end disks when closed thereon, and to this end, the shell parts are provided at their outer ends with semi-circular flanges 52, 52a having roughened or serrated inner faces 53 which are adapted to engage with the serrated annular rim face 54 of the removable end disk 39. The end disk 35 may be suitably held against rotation by a spring-pressed locking plunger 55 operating in a plunger housing 56 carried by the upper shell part 49 and which is adapted to enter a plunger socket 57 formed in the peripheral surface of the end disk 35. Accordingly, upon the shell parts 48, 49 closing on the end disks 35, 39 said end disks are effectively locked against rotation by the shell parts forming the winding cylinder.

Figure 4:
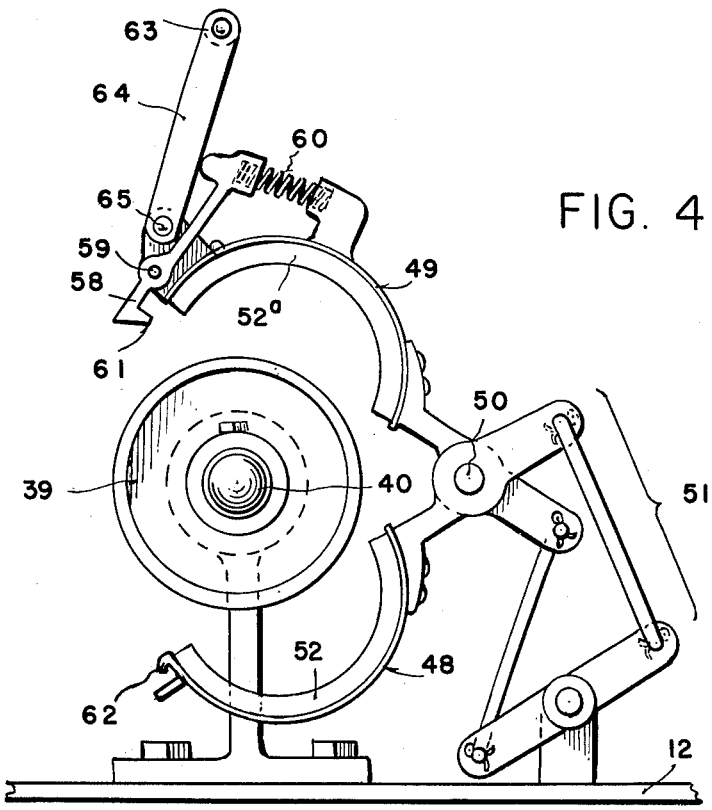
Fig. 4 is an end view of the winding mandrel, the semi-cylindrical shells forming a winding cylinder in their open position, and the linkage mechanism for opening and closing said shells about the mandrel.

The shell parts are adapted to be latched together in their closed position by means of a latch arm 58 pivoted at 59 to the upper shell member 49, the latch arm being biased in counterclockwise direction by means of a spring 60 effective on its upper end. The lower end of the latch arm is formed as a hook 61 adapted to engage beneath a detent 62 provided on the lower shell member 48, thereby to latch the shell members 48, 49 in their closed position once they are brought together. A hand bar 63 extending the full length of the upper shell member 48 is supported at its ends in arms 64 pivoted at 65 to said shell member. As seen in Fig. 4, the rearward edge of one of said arms 64 is adapted to bear against the upper end of the latch arm 58 and to swing said latch arm in clockwise direction, when the hand bar 63 is pushed rearwardly, whereby the latching means is tripped responsively to rearward push on the hand bar.

The above described arrangement provides that when the hand bar 63 is pulled forwardly, the shell members 48, 49 move towards one another to their closed position by virtue of the linkage mechanism 51 and are automatically latched closed by engagement of latch hook 61 with detent 62. When it is desired to open the cylinder, i. e. separate the shell members 48, 49, the hand bar 63 is pushed rearwardly, such resulting in unlatching of the shell members and their movement to their open position as shown in Fig. 4 through the medium of the linkage mechanism 51.

Figure 7:
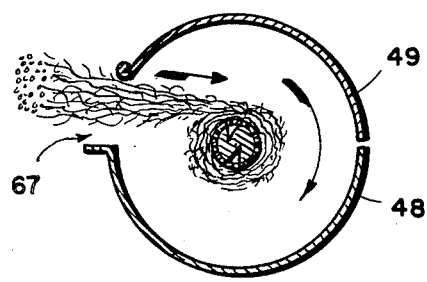
Figs. 7 and 8 are detail views illustrating the manner and direction of winding of a rope of loosely associated cotton fibers on a mandrel as shown in Fig. 6 in the formation of the filter body.

To provide an opening to winding cylinder interior through which an operator may insert the material to be wound with his (or her) fingers and which he holds against the rotating tubular inner screen 37 to start the winding operation, and through which the material is drawn as the winding operation proceeds, the shell members are cut away along their forward meeting edges to provide an elongated slot 67 (as best seen in Fig. 7) which extends substantially the full axial length of the winding cylinder, including the excess length portion thereof as seen in Fig. 2. The added length of the slot 67 provides for the winding of filter bodies of greater axial length than that for which the illustrated machine is set up to wind. In case the longer filter bodies require a diameter of core which is substantially greater than the diameter of the mandrel 32, it will be appreciated that the larger diameter cores may be mounted on the mandrel 32 and driven thereby, since the width of the clutch bars 43 is such that their gripping edge 45 may extend a substantial distance beyond the circle of the mandrel, thus to accommodate the mandrel to the larger diameter cores.

The operation of a winding machine as aforesaid in producing a filter body will now be described. At the start of a winding operation, the foot pedal 29 is raised with the result that drive to the powered shaft 14 is interrupted. It will be assumed also that the shell parts 48, 49 constituting the winding cylinder are in their open position to which they were actuated upon the completion of a prior winding operation, and that the bearing sleeve 38, its handle 40, and the end disk 39 carried by said sleeve are separated from the mandrel 32. The operator now positions the tubular inner screen 37 forming the core for the filter body to be wound on the mandrel 32, giving the screen a slight clockwise twist as required to retract the clutch bars 43. Upon the screen 37 being mounted on the mandrel with its inner end seating in the counterbore 36, the aforesaid assembly comprising the bearing sleeve 38, its handle 40 and the end disk 39 is coupled to the outer end of the mandrel, such coupling operation resulting in the outer end of the tubular inner screen 37 seating in the counterbore 36a.

The winding cylinder is now closed by pulling forward on the hand bar 63, such resulting in the upper and lower shell members 48, 49 coming together, closing on the end disks 35, 39 and locking therewith.

The operator now puts the winding mandrel into operation by depressing the foot pedal 29, which results in the tubular inner screen 37 being driven through the powered shaft 14 and mandrel 32.

Figure 8:
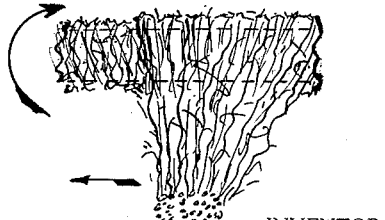

Next the operator inserts with his fingers the end of a rope or bunch of loosely associated cotton yarns into the winding cylinder through the slot 67 and holds same against the now rotating inner screen 37, such resulting in the threads or fibers making up the rope catching on the outer surface of the tubular inner screen 37 by virtue of said surface being roughened by the perforations formed therein, as generally indicated in Fig. 7. As the loosely associated yarns or threads are wound on said inner screen, the operator applies thereto the necessary tension to make a hard filter body or a soft one, whichever is required, by motion of the hand from side to side, as generally indicated in Fig. 8. This causes the yarns or threads to crisscross and to build up evenly throughout the full axial length of the cylinder, thus in effect to weave a solid cylindrical filter body.

Upon the operator determining that the filter body has been built up to size for its full axial length, he releases pressure on the foot pedal 29, and thereupon exerts rearward push on the hand bar 63, which results in opening of the winding cylinder.

Figure 9:
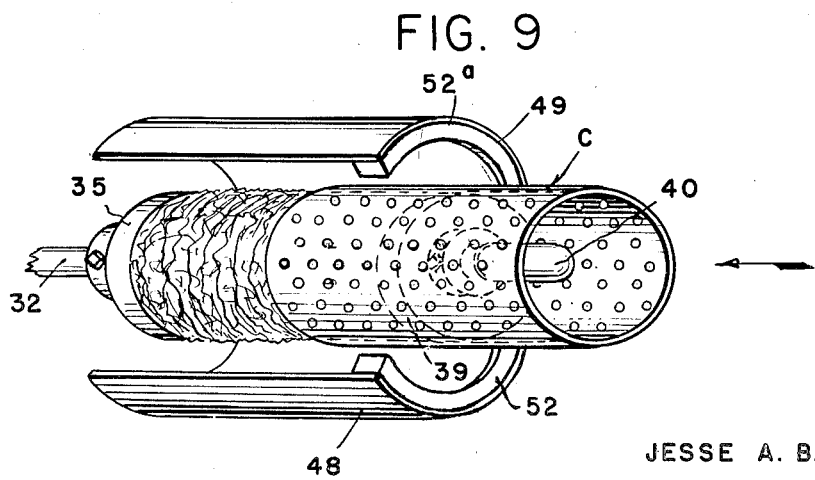
Fig. 9 is a detail view illustrating the manner of assembling the cylindrical outer shell of the filter element on the wound filter body prior to its removal from the winding machine.

In a final operation illustrated in Fig. 9, the cylindrical outer shell C of the filter element, which is preferably a perforated cardboard shell of the type disclosed in my prior Patent No. 2,357,572, is assembled on the wound filter body, after the winding cylinder has been opened and preferably while the mandrel is still turning, since the shell can be slipped over the wound element when it is turning much easier and without bunching thereof than when it is standing still. The outer cardboard shell C may be forced over the removable end disk 39 while the latter is still coupled through its bearing sleeve 38 to the mandrel, in which case the filter and outer tubular shell are removed from the mandrel through the use of the handle 40, upon rotation of the mandrel having been stopped, or the end disk may be uncoupled from the mandrel prior to assembly of the outer shell on the wound body, in which latter case the removal of the filter body and its outer shell is effected by grasping the shell and giving it a slight clockwise twist as required to disengage the clutch bars 43 from the inner screen core thereof.

Without further analysis it will be appreciated that a winding machine as described achieves the desirable objectives set forth in the foregoing. Due to the control permitted to be exercised by the operator on the rope of loosely associated threads being wound to the form of a cylindrical filter body, the latter has what might be termed homogeneous thread structure throughout, since no division lines between the convolutions or windings of the rope of threads exist in the finally wound body. Moreover, due to the fact that the filter body is built up in criss-cross fashion, the threads making up the same are blended together and interlock, as required to prevent channelling, and the density of the filter body is further such that no undue compression thereof takes place under the condition of oil flow therethrough.

A winding machine as aforesaid also permits the high speed production of filter elements comprising an inner tubular screen, an intermediate body of absorbent material, and an outer tubular shell preferably of cardboard material, it being observed that the only additional operations required for the filter element are those of flanging the protruding ends of the inner screen in outward direction, and applying the metallic end caps. A filter body winding machine as aforesaid is also of advantage in that it permits assembly of the outer shell on the absorbent filter body while the latter is still in the machine and before any change in the structure of the body can take place following its winding.

As many changes could be made in carrying out the above constructions without departing from the scope of the invention, it is intended that all matter contained in the above description or shown in the accompanying drawings shall be interpreted as illustrative and not in a limiting sense.

I claim:

1. A filter-body winding machine comprising, in combination, a rotary mandrel, a tubular screen member adapted to form the core of said filter body disposed on but separable from said mandrel, a releasable driving connection between said mandrel and said screen member for positively driving the latter, end disks for defining the ends of the filter body mounted on said mandrel and being spaced the axial dimension of the filter body, means for securing said end disks against rotation, and means for rotating said mandrel.

2. A filter-body winding machine as defined in claim 1, wherein the ends of the screen extend a short distance into the central portions of said end disks, whereby the ends of the screen protrude beyond the ends of the filter body.

3. A filter-body winding machine as defined in claim 1, wherein the end disks are journaled on inner bearing sleeves which are coupled to the mandrel for rotation therewith.

4. A filter-body winding machine as set forth in claim 1, wherein one of the end disks is bodily removable from said mandrel so as to permit withdrawal of the wound filter body and the screen member forming the core thereof from the mandrel.

5. A filter-body winding machine comprising, in combination, a rotary mandrel supported at one end thereof, clutch means carried by said mandrel for imparting rotation to a tubular screen member mounted thereon and adapted to form the core of the filter body, said clutch means being operative to permit release of said screen member upon slight rotary movement relative to the mandrel in one direction, an end disk non-rotatably affixed to said mandrel adjacent its supported end, an end disk non-rotatably and removably mounted on said mandrel adjacent its other end, said end disks being spaced from one another the axial dimension of the filter body, and means for rotating said mandrel.

6. A filter-body winding machine as defined in claim 5, wherein the axial length of the tubular screen member exceeds the spacing between the end disks, and said end disks are provided with counterbores in their central portion to receive the ends of the tubular screen member.

7. A filter-body winding machine as defined in claim 5, wherein said clutch means includes a bar member seated in a longitudinally extending groove in the mandrel, said bar member being pivoted at its ends and adjacent its inner edge to the ends of the groove and having width such that in its normal position its outer edge projects beyond the periphery of the mandrel, said bar member being movable in said groove from said normal position to a retracted position in which said outer edge is contained within the periphery of the mandrel, said outer edge being roughened to provide a driving surface.

8. A filter-body winding machine comprising, in combination, a rotary mandrel supported at one end thereof, clutch means carried by said mandrel operative on the internal surface of a tubular screen member adapted to form the core of a filter body for driving said screen member with said mandrel upon the mandrel being turned in one direction, said clutch member being operative to effect release of said tubular member when the latter is turned in the same direction relative to the mandrel, a pair of oppositely disposed end disks non-rotatably mounted on said mandrel for defining the ends of the filter body, and a pair of oppositely disposed semi-cylindrical members operatively associated with said mandrel and end disks and being mounted for swinging movement toward and away from one another in unison, said sections adapted to close against the peripheral surfaces of the end disks to provide a winding cylinder which is closed at its ends by said end disks.

9. A filter-body winding machine as set forth in claim 8, wherein at least one of said semi-cylindrical sections is provided with a slot through which the material being wound may enter the winding cylinder.

10. A filter-body winding machine as set forth in claim 8, wherein the end disks are spaced an adjustable distance apart, whereby to provide for the winding of filter bodies of varying axial lengths.

11. A filter-body winding machine as set forth in claim 8, wherein one end disk is affixed to the mandrel adjacent the supported end thereof, and the other end disk is removably coupled to the mandrel at its other end.

12. A filter-body winding machine comprising, in combination, a rotary mandrel supported at one end thereof, clutch means carried by said mandrel operative on the internal periphery of a tubular screen member adapted to form the core of a filter body for driving said screen member with the mandrel when the latter is turned in one direction, said clutch member being operative to effect release of said tubular screen member when the latter is turned in the same direction relative to the mandrel, a pair of end disk assemblies, one affixed to the mandrel adjacent its supported end and the other removably coupled to the mandrel adjacent its other end, each said end disk assembly including a bearing sleeve rotatable with the mandrel and an end disk journaled on said bearing sleeve, the end disk assembly removably coupled to the mandrel being provided with an outwardly extending handle, and a two-part winding cylinder operatively associated with said mandrel and adapted to be closed about the end disks, said cylinder and end disks adapted to provide an interior space surrounding the tubular screen member for imparting cylindrical definition to the filter body being wound on the rotating tubular screen.

13. A filter-body winding machine comprising, in combination, means for mounting a tubular screen member adapted to form the core of said filter body for rotation about an axis, means for rotating said screen member, cylinder-forming means adapted to form a closed winding cylinder about said screen member and being provided with a longitudinal slot through which a rope of filter-body material may be supplied for winding on said core, said cylindrical-forming means including semi-cylindrical shell members adapted when closed on one another to form a full cylinder, and means mounting said shell members for closing and separating movement with respect to one another, the construction and arrangement being such that upon completion of the winding operation and opening of the shell members a filter outer shell may be slipped over the wound filter body while it is mounted and being rotated as aforesaid.

14. A filter-body winding machine comprising, in combination, means for mounting a tubular screen member adapted to form the core of said filter body for rotation about an axis, means for rotating said screen member, cylinder-forming means adapted to form a closed winding cylinder about said screen member and being provided with a longitudinal slot through which a rope of filter-body material may be supplied for winding on said core, said cylinder-forming means comprising non-rotatable cylinder end-members operatively associated with the ends of the screen member, semi-cylindrical shell members adapted when closed on one another and about said end-members to form with said end members a full cylinder having closed ends, and means mounting said shell members for closing and separating movement with respect to one another, the construction and arrangement being such that upon completion of the winding operation and opening of the shell members a filter outer shell may be slipped over the wound filter body while it is mounted and being rotated as aforesaid.

15. A filter-body winding machine as set forth in claim 13, wherein said longitudinal slot is formed between two adjacent edges of the shell members.

16. A filter-body winding machine as set forth in claim 13, combined with automatic latch means for locking the shell members closed with respect to one another upon said members being moved to their closed position.

17. A filter-body winding machine as set forth in claim 13, combined with automatic latch means for locking the shell members closed with respect to one another upon said members being moved to their closed position, and manual means operative when actuated in one direction to effect release of said latch means and separation of said shell members and when actuated in the reverse direction to effect closing of said shell members.

JESSE A. BALDWIN.

References Cited in the file of this patent

UNITED STATES PATENTS

| Number | Name | Date |
|---|---|---|
| 775,681 | Prest | Nov. 22, 1904 |
| 2,141,144 | Warner | Dec. 20, 1938 |
| 2,156,089 | Hinnekens | Apr. 25, 1939 |
| 2,183,522 | Wittel et al. | Dec. 19, 1939 |
| 2,203,815 | Dahl et al. | June 11, 1940 |